United States Patent
Cho et al.

(10) Patent No.: US 8,107,986 B2
(45) Date of Patent: Jan. 31, 2012

(54) METHOD AND APPARATUS FOR CONTROLLING POWER IN A COMMUNICATION SYSTEM

(75) Inventors: Jae-Hee Cho, Seoul (KR); Heon-Ki Chae, Seongnam-si (KR); Soon-Young Yoon, Seoul (KR); In-Seok Hwang, Seoul (KR); June Moon, Seoul (KR)

(73) Assignee: Samsung Electronics Co., Ltd (KR)

( * ) Notice: Subject to any disclaimer, the term of this patent is extended or adjusted under 35 U.S.C. 154(b) by 552 days.

(21) Appl. No.: 11/764,623

(22) Filed: Jun. 18, 2007

(65) Prior Publication Data
US 2008/0108379 A1 May 8, 2008

(30) Foreign Application Priority Data
Jun. 16, 2006 (KR) .................. 10-2006-0054515

(51) Int. Cl.
*H04B 7/00* (2006.01)
*H04B 1/00* (2006.01)
*H04B 7/185* (2006.01)
*H04B 7/212* (2006.01)
*H04W 72/00* (2009.01)
*H04L 12/28* (2006.01)
*H04L 5/14* (2006.01)
*H04J 3/22* (2006.01)
*H04J 3/00* (2006.01)

(52) U.S. Cl. ....... 455/522; 455/452.2; 455/70; 455/450; 455/509; 370/318; 370/431; 370/468; 370/280; 370/294; 370/337

(58) Field of Classification Search .................. 455/522, 455/452.2, 70, 450, 509; 370/318, 431, 468, 370/280, 294, 337
See application file for complete search history.

(56) References Cited

U.S. PATENT DOCUMENTS

| 6,307,844 | B1 | 10/2001 | Tsunehara et al. | |
| 7,630,391 | B2 * | 12/2009 | Jin et al. | 370/431 |
| 2001/0053140 | A1 * | 12/2001 | Choi et al. | 370/335 |
| 2003/0103476 | A1 * | 6/2003 | Choi et al. | 370/329 |
| 2003/0185159 | A1 * | 10/2003 | Seo et al. | 370/278 |
| 2004/0001447 | A1 * | 1/2004 | Schafer | 370/280 |
| 2004/0179493 | A1 * | 9/2004 | Khan | 370/332 |
| 2004/0248606 | A1 * | 12/2004 | Suzuki et al. | 455/522 |
| 2005/0101245 | A1 * | 5/2005 | Ahmavaara | 455/1 |
| 2006/0264218 | A1 * | 11/2006 | Zhang et al. | 455/450 |
| 2007/0049316 | A1 | 3/2007 | Beming et al. | |
| 2007/0054689 | A1 * | 3/2007 | Baker et al. | 455/522 |

(Continued)

FOREIGN PATENT DOCUMENTS
EP    1 458 118    9/2004
(Continued)

*Primary Examiner* — Temesgh Ghebretinsae
*Assistant Examiner* — Bobbak Safaipour
(74) *Attorney, Agent, or Firm* — The Farrell Law Firm, P.C.

(57) ABSTRACT

A method for controlling power in a communication system. The power control method in a base station includes receiving channel information from a plurality of mobile stations, and generating power control information of the mobile stations according to the received channel information; mapping the generated power control information to transmission fields of corresponding mobile stations according to allocation information of channels allocated to receive the channel information; and broadcasting to the mobile stations a message including the power control information mapped to the transmission fields of the corresponding mobile stations.

32 Claims, 9 Drawing Sheets

U.S. PATENT DOCUMENTS

| | | |
|---|---|---|
| 2008/0130560 A1 | 6/2008 | Khandekar et al. |
| 2008/0227476 A1 * | 9/2008 | Cho et al. .................. 455/522 |
| 2009/0137230 A1 | 5/2009 | Miyoshi et al. |
| 2009/0219855 A1 | 9/2009 | Ishii |
| 2009/0262670 A1 * | 10/2009 | Cho et al. .................. 370/280 |

FOREIGN PATENT DOCUMENTS

| | | |
|---|---|---|
| JP | 10-173594 | 6/1998 |
| WO | WO 2004/102828 | 11/2004 |
| WO | WO 2006/043773 | 4/2006 |

\* cited by examiner

METHOD AND APPARATUS FOR CONTROLLING POWER IN A COMMUNICATION SYSTEM

PRIORITY

This application claims priority under 35 U.S.C. §119(a) to a Korean Patent Application filed in the Korean Intellectual Property Office on Jun. 16, 2006 and assigned Serial No. 2006-54515, the disclosure of which is incorporated herein by reference.

BACKGROUND OF THE INVENTION

1. Field of the Invention

The present invention generally relates to a communication system, and in particular, to a system and method for controlling power of a Mobile Station (MS) in a communication system.

2. Description of the Related Art

Extensive research on next generation communication systems are being conducted to provide users with high-speed services having various Quality of Service (QoS) levels. Meanwhile, power control schemes used in current communication systems can normally be classified as downlink (forward) power control schemes and uplink (reverse) power control schemes according to direction of power control, and can be classified as open-loop power control schemes and closed-loop power control schemes according to whether a transmitter, or a Base Station (BS), receives feedback information from a receiver, or an MS.

In downlink power control schemes, power control is performed in a BS. When the channel condition is good as a distance between the BS and an MS is short, i.e. as the MS is located in a center area of the BS, or as there is no shadowing due to obstacles, the BS allows the MS to transmit signals with minimum possible transmission power, thereby reducing interference to neighboring BSs. When channel conditions are poor, the BS increases power of transmission signals as high as needed within a possible range so the MS may normally receive transmission signals from the BS. In uplink power control schemes, power control is performed in an MS. The MS serves as a transmitter and the BS serves as a receiver, and they control power in the same manner as that in downlink power control schemes.

In open-loop power control schemes, a transmitter (BS or MS) performing power control, independently determines channel quality of a receiver (MS or BS), and performs power control depending on the channel quality, and open-loop power control scheme control power based on reversibility between downlink and uplink channels. Reversibility between downlink and uplink channels, as used herein, means that MSs having the same (or similar) location with respect to a BS will experience similar path attenuation due to similar path attenuation based on a distance from the BS, the similar antenna gain based on antenna patterns, similar shadowing effect by the topology, similar multi-path fading, etc. That is, in open-loop power control schemes, based on reversibility between downlink and uplink channels, a transmitter spontaneously estimates signal reception quality of a receiver, calculates necessary transmission power depending on the estimated signal reception quality, and then transmits signals with the calculated transmission power.

In closed-loop power control schemes, unlike in open-loop power control schemes, a transmitter controls necessary transmission power based on signal reception quality of a receiver from which it has received a feedback channel, without independently determining a channel quality. In such a closed-loop power control scheme, overhead for feedback channels occurs undesirably. However, because a transmitter can acquire information on the channel quality at the receiver, a closed-loop power control scheme can accurately control power of transmission signals, as compared to an open-loop power control scheme.

However, in a typical communication system, as a number of MSs receiving communication services from a BS increases, a closed-loop power control scheme suffers from an increase in an amount of channel quality information that the BS should receive from MSs over a feedback channel. In addition, a closed-loop power control scheme suffers from an increase in overhead of a feedback channel allocated for receiving channel quality information. Further, in a typical communication system, when a BS transmits power control information of MSs to the MSs according to channel quality information fed back from the MSs, an increase in a number of MSs increases an amount of power control information that the BS should transmit to the MSs, and the increase in the amount of power control information for the MSs causes an increase in overhead in the communication system. Therefore, a need exists for a power control scheme for reducing overhead in communication systems.

SUMMARY OF THE INVENTION

The present invention addresses at least the problems and/or disadvantages and provides at least the advantages described below. Accordingly, an aspect of the present invention is to provide a system and method for controlling power in a communication system.

Another aspect of the present invention is to provide a system and method for controlling power of an MS to reduce overhead in a communication system.

Another aspect of the present invention is to provide a system and method for transmitting power control information for controlling power of an MS in a communication system.

According to an aspect of the present invention, there is provided a method for controlling power in a communication system. The power control method in a base station includes receiving channel information from a plurality of mobile stations, and generating power control information of the mobile stations according to the received channel information; mapping the generated power control information to transmission fields of corresponding mobile stations according to allocation information of channels allocated to receive the channel information; and broadcasting to the mobile stations a message including the power control information mapped to the transmission fields of the corresponding mobile stations.

According to another aspect of the present invention, there is provided a method for controlling power in a communication system. The power control method in a mobile station includes receiving a message including power control information from a base station, and detecting power control information included in the message; and detecting power control information corresponding to the base station from the detected power control information according to allocation information of a channel allocated to transmit channel information of the mobile station to the base station.

According to a further aspect of the present invention, there is provided a method for transmitting control information for at least one mobile station in a communication system. The transmission method in a base station includes receiving channel information from at least one mobile station; generating control information of mobile stations according to the received channel information; mapping the generated control information to transmission fields of corresponding mobile stations according to allocation orders of channels for the at least one mobile station, allocated to receive the channel information; and broadcasting, to the mobile stations, a message including transmission fields to which the control information of the corresponding mobile stations is mapped.

According to yet another aspect of the present invention, there is provided a system for controlling power in a communication system. The power control system includes a base station for receiving channel information from a plurality of mobile stations, generating power control information of the mobile stations according to the received channel information, mapping the generated power control information to transmission fields of corresponding mobile stations according to allocation information of channels allocated to receive the channel information, and broadcasting to the mobile stations a message including the power control information mapped to the transmission fields of the corresponding mobile stations.

According to still another aspect of the present invention, there is provided a system for controlling power in a communication system. The power control system includes a mobile station for receiving a message including power control information from a base station, detecting power control information included in the message, and detecting power control information corresponding to thereto from the detected power control information according to allocation information of a channel allocated to transmit channel information of the mobile station to the base station.

According to yet another aspect of the present invention, there is provided a system for controlling power in a communication system. The power control system includes a base station including a power control information generator for receiving channel information from a plurality of mobile stations, and generating power control information of the mobile stations according to the received channel information; a channel allocator for allocating channels to the mobile stations to receive the channel information; a power control bit sequence generator for mapping the generated power control information to transmission fields of corresponding mobile stations according to allocation information of the allocated channels, and generating a power control bit sequence according to the power control information mapped to the transmission fields of the corresponding mobile stations; and a message generator for generating a message including the generated power control bit sequence, wherein the base station broadcasts the generated message to the mobile stations.

According to still another aspect of the present invention, there is provided a system for controlling power in a communication system. The power control system includes a mobile station including a first detector for receiving a message including power control information from a base station, and detecting the power control information included in the message; a decider for checking allocation information of a channel allocated to transmit channel information of the mobile station to the base station; and a second detector for detecting, from the detected power control information, power control information corresponding thereto according to allocation information of the allocated channel, wherein the mobile station controls power of the mobile station according to the power control information detected by the second detector.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Figure 1:
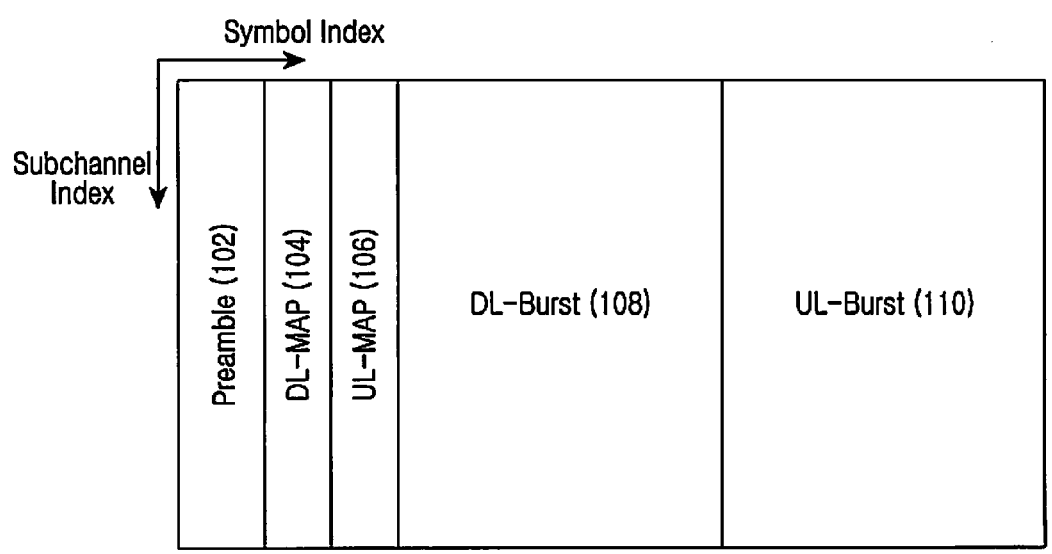
FIG. 1 is a schematic diagram illustrating a frame structure in a communication system according to the present invention.

Preferred embodiments of the present invention will now be described in with reference to the drawings. In the following description, a description of known functions and configurations incorporated herein has been omitted for clarity and conciseness.

The present invention provides a system and method for controlling power in a communication system, for example, an Institute of Electrical and Electronics Engineers (IEEE) 802.16 communication system, which is a Broadband Wireless Access (BWA) communication system. Although the present invention will be described herein with reference to an IEEE 802.16 communication system employing Orthogonal Frequency Division Multiplexing (OFDM)/Orthogonal Frequency Division Multiple Access (OFDMA), by way of example, a power control system and method provided in the present invention can also be applied to other communication systems.

In addition, the present invention provides a system and method for controlling power when a communication system exchanges data between a Base Station (BS) in charge of a particular cell and a Mobile Station (MS) that is located in the cell and receives a communication service from the BS. The present invention, described below, provides a power control system and method in which a BS in charge of a particular cell transmits, to an MS receiving a communication service therefrom, power control information for controlling power of the MS in a communication system employing OFDM/OFDMA.

The present invention provides a communication system in which a BS in charge of a particular cell generates power control information of MSs according to channel information of MSs, fed back from MSs located in the BS cell, i.e. Channel Quality Information (CQI), for example, Signal-to-Interference and Noise Ratio (SINR) or Carrier-to-Interference and Noise Ratio (CINR) that the MSs have calculated and transmitted to the BS; maps the generated power control information to corresponding MSs according to allocation information of Channel Quality Information Channels (CQICHs) allocated to the MSs to receive the CQI feedback; and then transmits a message with power control information to the MSs. In other words, the BS broadcasts the message to the MSs, and upon receipt of the broadcasted message, each of the MSs detects power control information corresponding thereto, and then controls power of the associated MS according to the detected power control information.

Further, in a communication system according to the present invention, for power control for a plurality of MSs in a particular cell, a BS generates power control information of the MSs according to CQIs of the MSs, generates a power control bit sequence Power_Control_Bit_Sequence according to the generated power control information, maps the power control information to the MSs according to CQICH allocation information, i.e. maps the power control bit sequence to the MSs, and then broadcasts a message with the power control bit sequence to the MSs. Upon receipt of the message, each of the MSs detects its own power control information included in the message, and controls power associated with the MS depending on the detected power control information.

As a result, in the communication system according to the present invention, even though a number of MSs are located in a particular cell, the BS in charge of the particular cell can minimize an increase in overhead by transmitting power control information over one burst field independently for individual frames of the MSs. In addition, the BS can control power of the MSs at high speed by transmitting power control information over one burst field independently for individual frames of the MSs.

A scheme in which a BS transmits power control information of the MSs, generated depending on CQIs of the MSs, in a message can be classified as a scheme of transmitting power control information in a Fast Power Control (FPC) message in a form of a Medium Access Control (MAC) message, a scheme of transmitting power control Information Elements (IEs) in Uplink MAP (UL-MAP) IEs of a UL-MAP message, and a scheme of transmitting Fast Tracking IEs in UL-MAP IEs of the UL-MAP message. These messages including power control information of the MSs are broadcasted to all MSs located in the cell.

In addition, a scheme in which the BS transmits in the above-described messages a power control bit sequence of the power control information generated depending on CQIs received from the MSs can be classified herein into a scheme of transmitting the power control bit sequence in a power control message in the form of a MAC message, a scheme of transmitting the power control bit sequence in a MAP message, for example, Downlink MAP (DL-MAP) message or UL-MAP message, and a scheme of transmitting the power control bit sequence in DL-MAP IEs or UL-MAP IEs of a MAP message, for example, DL-MAP message or UL-MAP message. Similarly, these messages including therein the power control bit sequence are broadcasted to all MSs located in the cell.

With reference to Table 1, a description will now made of an FPC message including the power control information. Table 1 shows a format of an FPC message including power control information.

TABLE 1

| Syntax | Bits | Notes |
|---|---|---|
| Fast_Power_Control Message Format{ | | |
|     Management Message Type = 38 | 8 bits | |
|     Number of stations | 8 bits | |
|     Power measurement frame | 8 bits | |
|     for(n=0;n<Number of stations;n++){ | | |
|         Basic CID | 16 bits | |
|         Power adjust | 8 bits | |
|     } | | |
| } | | |

As shown in Table 1, the FPC message includes a 'Management Message Type' field indicating a type of a corresponding management message, a 'Number of stations' field indicating unique numbers of MSs, a 'Power management frame' field indicating a power management frame, a 'Basic CID' field indicating a basic Connection Identifier (CID) for each of MSs, and a 'Power adjust' field indicating power adjustment for each of the MSs. To transmit power control information of the MSs through the FPC message, the BS includes basic CIDs of the MSs in the Basic CID field of the FPC message and transmits the FPC message to the MSs.

An IEEE 802.16 communication system, a typical BWA communication system, has a frame structure, and a BS of the system efficiently allocates resources of each frame to MSs, and transmits the resource allocation information to the MSs through a MAP message. A MAP message used for transmitting the downlink resource allocation information is a DL-MAP message, and a MAP message used for transmitting uplink resource allocation information is a UL-MAP message.

When the BS transmits the downlink resource allocation information and the uplink resource allocation information through the DL-MAP message and the UL-MAP message in this manner, the MSs can decode the DL-MAP message and the UL-MAP message, transmitted from the BS, and detect therefrom power control information, and control information for the allocation locations where resources are allocated to them, and for the data that they should receive. The MSs can receive or transmit data over the downlink or the uplink by detecting the resource allocation location and control information. In addition, when transmitting data, the MSs can control transmission power using the power control information.

The MAP message is composed of different MAP IE formats according to whether it is for a downlink or an uplink, and according to a type of a data burst, i.e. according to whether the data burst is (i) a data burst to which Hybrid Automatic Repeat reQuest (HARQ) is applied (HARQ data burst), (ii) a data burst to which HARQ is not applied (Non-HARQ data burst), or (iii) control information. Therefore, the MSs should previously know a format of each MAP IE to decode the MAP IE, and each MAP IE can be distinguished using a Downlink Interval Usage Code (DIUC), for the downlink, and using an Uplink Interval Usage Code (UIUC), for the uplink.

As described above, in the BWA communication system, data transmission is performed frame by frame, and each frame is divided into a field for transmitting downlink data and a field for transmitting uplink data. The fields for transmitting data are formed in a 2-dimensional arrangement of 'frequency domain'בtime domain', and each element in the 2-dimensional arrangement is a slot which is an allocation unit. That is, the frequency domain is divided in units of subchannels, each of which is a bundle of subcarriers, and the time domain is divided in units of symbols. Therefore, the slot indicates a field where a symbol is occupied by one subchannel. Each slot is allocated only to one arbitrary MS among the MSs located in one cell, and a set of slots allocated to each of MSs located in the cell is a burst. As described above, in the communication system, uplink wireless resources are allocated in such a manner that slots are shared by MSs. With reference to FIG. 1, a description will now be made of a frame structure in a communication system according to the present invention.

FIG. 1 shows a frame structure in a communication system according to the present invention. Referring to FIG. 1, the frame is shown by subchannels in the frequency domain and symbols in the time domain. The y-axis indicates subchannels which are resource units of frequency, and the x-axis indicates OFDM symbols which are resource units of time. The frame includes a preamble field 102, a DL-MAP message field 104, a UL-MAP message field 106, a downlink burst (DL Burst) field 108, and an uplink burst (UL Burst) field 110.

Figure 2:
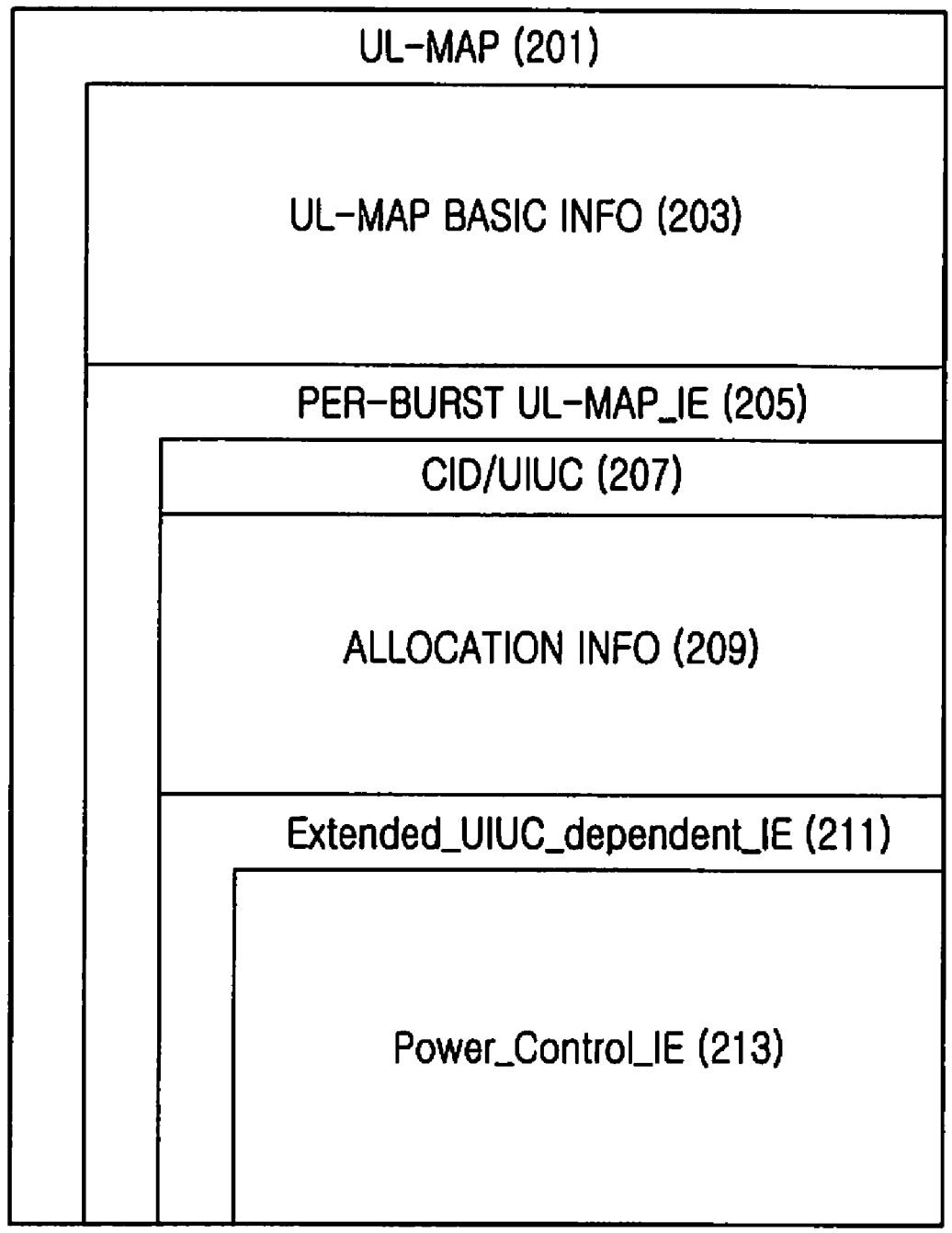
FIG. 2 is a schematic diagram illustrating a structure of an Uplink (UL)-MAP message field of a frame in a communication system according to the present invention.

The preamble field 102 is used for transmitting a synchronization signal, or a preamble sequence, for acquisition of a transmission/reception period, i.e. acquisition of synchronization between a BS and MSs in a communication system. The DL-MAP message field 104 is used for transmitting a DL-MAP message, and the UL-MAP message field 106 is used for transmitting a UL-MAP message. The DL-MAP message field 104, although not shown, includes a plurality of IEs, and the IEs each include information on the corresponding downlink burst field. Similarly, the UL-MAP message field 106, although not shown, includes a plurality of IEs, and the IEs each include information on the corresponding uplink burst field and power control information of the MSs. The downlink burst field 108 is used for transmitting the corresponding downlink data burst, and the uplink burst field 110 is used for transmitting the corresponding uplink data burst. With reference to FIG. 2 and Table 2, a description will now be made of a scheme of transmitting power control IEs in UL-MAP IEs of a UL-MAP message, among the above-described schemes of transmitting power control information in a message.

FIG. 2 shows a structure of a UL-MAP message field of a frame in a communication system according to the present invention. Referring to FIG. 2, the UL-MAP message field 201 includes a UL-MAP basic information field 203 for transmitting basic information of a UL-MAP message, and a per-burst UL-MAP IE field 205 for transmitting per-burst UL-MAP IEs. The per-burst UL-MAP IE field 205 includes a CID/UIUC field 207 for transmitting CID and UIUC for per-burst allocation information and power control information of the MSs, an allocation information field 209 for transmitting burst allocation information, and an extended UIUC-dependent IE field 211 for transmitting extended UIUC-dependent IEs, and the extended UIUC-dependent IE field 211 includes a power control IE field 213 for transmitting power control IEs having power control parameters separately defined for individual MSs, for transmitting power control information of the MSs.

Table 2 shows UL-MAP IEs of a UL-MAP message, which include power control IEs.

TABLE 2

| Syntax | Bits |
|---|---|
| UL-MAP_IE{ | |
|   CID | 16 bits |
|   UIUC | 4 bits |
|   if(UIUC==15){ | |
|     Extended_UIUC_dependent_IE{ | |
|       Power_Control_IE{ | |
|         Extended_UIUC=0x00 | 4 bits |
|         Length | 4 bits |
|         Power_Control | 8 bits |
|       } | |
|     } | |
|   } | |
| } | |

As shown in Table 2, UL-MAP IEs of the UL-MAP message include CID and UIUC for per-burst allocation information and power control information of the MSs, and extended UIUC-dependent IEs, and the extended UIUC-dependent IEs include power control IEs having power control parameters separately defined for individual MSs according to power control information of the MSs. With reference to Table 3, a description will now be made of a scheme of transmitting Fast Tracking IEs in UL-MAP IEs of a UL-MAP message, among the above-described schemes of transmitting power control information in a message.

Table 3 shows UL-MAP IEs of a UL-MAP message, which include Fast Tracking IEs.

TABLE 3

| Syntax | Bits |
|---|---|
| UL-MAP_IE{ | |
|   CID | 16 bits |
|   UIUC | 4 bits |
|   if(UIUC==15){ | |
|     Extended_UIUC_dependent_IE{ | |
|       UL-MAP_Fast_Tracking_IE{ | |
|         Extended_UIUC=0x07 | 4 bits |
|         Length | variable |
|         Map Index | 2 bits |
|         for(i=0;i<n;1++){ | |
|           Power correction | 3 bits |
|           Frequency correction | 3 bits |
|           Time correction | 2 bits |
|         } | |
|       } | |
|     } | |
|   } | |
| } | |

As shown in Table 3, UL-MAP IEs of the UL-MAP message, like in Table 2, include CID and UIUC for per-burst allocation information and power control information of the MSs, and extended UIUC-dependent IEs. While the extended UIUC-dependent IEs of the UL-MAP IEs of the UL-MAP message, shown in Table 2, include the power control IEs having power control parameters separately defined for individual MSs depending on the power control information of the MSs, the extended UIUC-dependent IEs of the UL-MAP IEs of the UL-MAP message, shown in Table 3, include Fast Tracking IEs of the UL-MAP message, which include power control information for all MSs located in the cell. The Fast Tracking IEs of the UL-MAP message are used as additional information in addition to the information for the MSs, previously delivered at a previous frame, and are equal to unicast allocation IEs in the UL-MAP message. In addition, the Fast Tracking IEs of the UL-MAP message can be transmitted over the power control IE field 213 of FIG. 2, over which the power control IEs shown in Table 2 are transmitted.

Figure 3:
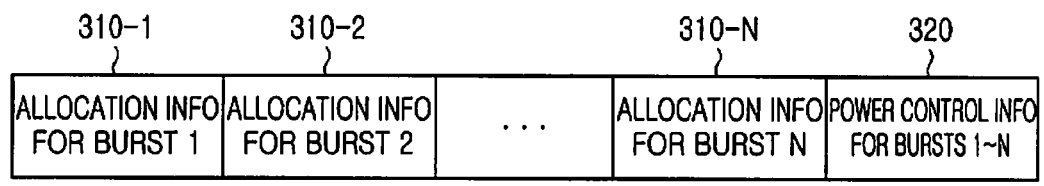
FIG. 3 is a diagram illustrating a burst allocation information field and a power control information field in a MAP message field of a frame in a communication system according to the present invention.
Figure 4:
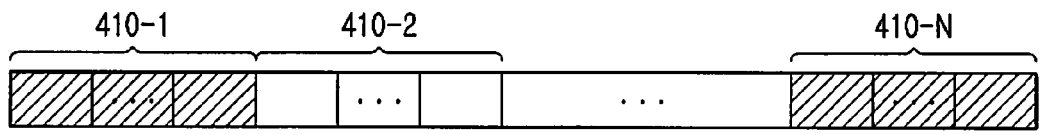
FIG. 4 is a diagram illustrating a power control bit sequence for power control in a communication system according to the present invention.

A description will now be made of a scheme in which a BS transmits in a foregoing message a power control bit sequence of power control information generated according to CQIs of MSs in a communication system according to the present invention. A description will then be made of a process of transmitting the message including the power control bit sequence to the MSs, and controlling power of the MSs. With reference to FIG. 3, a description will first be made of a burst allocation information field and power control information field in the MAP message field of the foregoing frame. With reference to FIG. 4, a description will be made of the power control bit sequence of the power control information that the BS has generated depending on CQIs of the MSs. Thereafter, with reference to FIG. 5, a description will be made of CQICH allocation for transmission of CQIs of the MSs, and with reference to FIGS. 6 and 7, a description will be made of a method of mapping the generated power control information to the corresponding MSs according to the CQICH allocation information.

FIG. 3 shows a burst allocation information field and a power control information field in a MAP message field of a frame in a communication system according to the present invention. Referring to FIG. 3, in the communication system, when N MSs are located in a cell, a burst field of the frame is divided into N sub-burst fields, and then allocated to the N MSs on a one-to-one basis. The allocation information of the divided burst field is transmitted to the MSs over a MAP message field of the frame, which is divided into N burst allocation information fields 310-1, 310-2, ..., 310-N. At this point, power control information of the MSs is transmitted to the MSs over one power control information field 320 divided from the MAP message field. That is, in a communication system according to the present invention, power control information of all MSs located in a particular cell is transmitted to the MSs, i.e. broadcasted to the MSs, over the one power control information field 320 allocated in the MAP message field of the frame. Accordingly, in a communication system according to the present invention, even though a number of MSs located in a particular cell increases, the system can minimize an increase in overhead as a BS in charge of the cell transmits per-frame power control information of the MSs over the one power control information field 320 allocated in the MAP message field of the frame. In addition, a communication system according to the present invention can rapidly control power of the MSs as the BS transmits per-frame power control information of the MSs over the one power control information field 320 allocated in the MAP message field of the frame.

FIG. 4 shows a power control bit sequence for power control in a communication system according to the present invention. Referring to FIG. 4, in the communication system, a BS generates power control information of MSs according to CQIs received from N MSs located in the cell of the BS, and generates a power control bit sequence of the MSs, i.e. N power control bits 410-1, 410-2, ..., 410-N for the MSs, according to the generated power control information. The power control bits 410-1, 410-2, ..., 410-N of the MSs are each composed of m bits.

More specifically, for m=1, indicating that the power control bits 410-1, 410-2, ..., 410-N of the MSs are each composed of 1 bit, when the power control bits 410-1, 410-2, ..., 410-N of the MSs are set to '0', the MSs are ordered to keep the current power level, and when the power control bits 410-1, 410-2, ..., 410-N of the MSs are set to '1', the MSs are ordered to increase or decrease the current power level by a threshold. For m=2, indicating that the power control bits 410-1, 410-2, ..., 410-N of the MSs are each composed of 2 bits, when the power control bits 410-1, 410-2, ..., 410-N of the MSs are set to '00', the MSs are ordered to keep the current power level; when the power control bits 410-1, 410-2, ..., 410-N of the MSs are set to '01', the MSs are ordered to increase the current power level by a threshold; and when the power control bits 410-1, 410-2, ..., 410-N of the MSs are set to '11', the MSs are ordered to decrease the current power level by a threshold. For m=n, indicating that the power control bits 410-1, 410-2, ..., 410-N of the MSs are each composed of n bits, power of the MSs is changed in a type of a signed integer. For example, for n=5, when the power control bits 410-1, 410-2, ..., 410-N of the MSs are set to '00100', the MSs are ordered to increase the current power level by 4 times a threshold, and when the power control bits 410-1, 410-2, ..., 410-N of the MSs are set to '11100', the MSs are ordered to decrease the current power level by 4 times a threshold. Current power level, as used herein, refers to a transmission power level used when the MSs transmit their CQIs to the BS over CQICHs, and the 'threshold' refers to a value predetermined by the user or the system according to communication system and communication environment.

Figure 5:
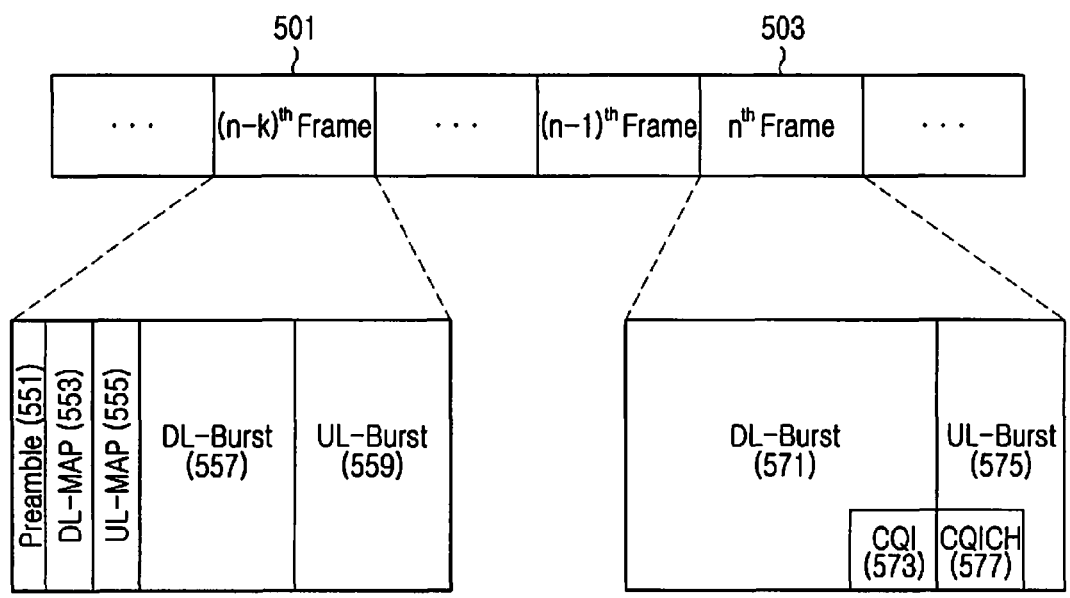
FIG. 5 is a diagram illustrating allocation of Channel Quality Information Channels (CQICHs) over which a BS receives Channel Quality Information (CQI) from MSs in a communication system according to the present invention.
Figure 6A:
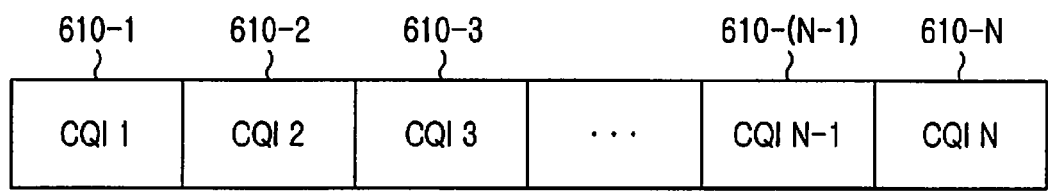
FIGS. 6A and 6B are diagrams illustrating a method of mapping power control information to corresponding MSs according to CQICH allocation information of the MSs in a communication system according to the present invention.

FIG. 5 shows allocation of CQICHs over which a BS receives CQIs from MSs in a communication system according to the present invention. Referring to FIG. 5, the BS of the communication system includes, in an $(n-k)^{th}$ frame 501, a preamble field 551, a DL-MAP message field 553, a UL-MAP message field 555, a downlink burst field 557, and an uplink burst field 559, as described in FIG. 1. The BS transmits to MSs a UL-MAP message which is transmitted over the UL-MAP message field 555 of the $(n-k)^{th}$ frame 501, and allocates it to a downlink burst field 571 of an $n^{th}$ frame 503 to provide the MSs with information on a CQI field 573 indicating CQIs to be transmitted by the MSs, and information on a CQICH field 577 allocated such that the MSs may transmit CQIs over it according to information transmitted over the CQI field 573. That is, the BS broadcasts to the MSs the UL-MAP message transmitted over the UL-MAP message field 555 of the $(n-k)^{th}$ frame 501, so the MSs can acquire information on the CQICH field 577 allocated to the MSs themselves in an uplink burst field 575 of the $n^{th}$ frame 503 and information on CQIs transmitted over the allocated CQICH field 577. With reference to FIGS. 6A and 7A, a detailed description will now be made of CQICH allocation to the MSs, and with reference to FIGS. 6B and 7B, a description will be made of mapping of power control information to the corresponding MSs according to the CQICH allocation of FIGS. 6A and 7A.

Figure 6B:
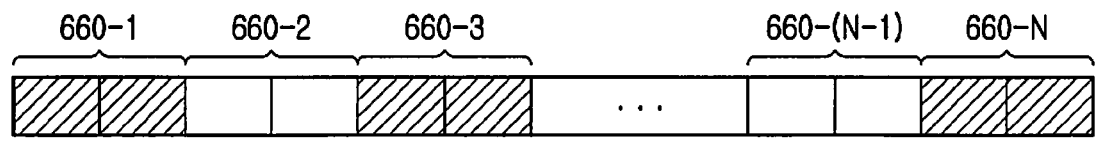
Figure 7A:
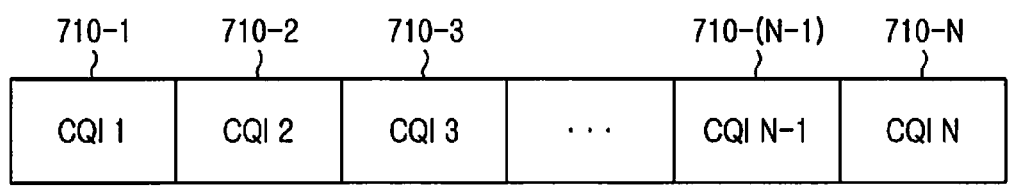
FIGS. 7A and 7B are diagrams illustrating a method of mapping power control information to corresponding MSs according to CQICH allocation information of MSs in a communication system according to the present invention.

FIGS. 6A and 6B show a method of mapping power control information to corresponding MSs according to CQICH allocation information of the MSs in a communication system according to the present invention. Referring to FIGS. 6A and 6B, in the communication system, when there are N MSs located in a cell, a CQICH field in an uplink burst field of a frame is divided into N sub-CQICH fields 610-1, 610-2, 610-3, ..., 610-(N−1), 610-N, and then allocated to the N MSs on a one-to-one basis. The allocation information of the divided CQICH field is broadcasted to the N MSs over a MAP message field, i.e. the UL-MAP message field, of the frame as described above. The sub-CQICH fields 610-1, 610-2, 610-3, ..., 610-(N−1), 610-N are allocated to the MSs at every frame so the MSs may transmit CQIs to the BS over them. As described above, based on the MAP message, the MSs each recognize CQICHs allocated to them by the BS, in other words, recognize indexes CQI #1, CQI #2, CQI #3, . . . , #CQI #(N−1) and CQI #N of CQICHs, for example, unique numbers and allocation orders of CQICHs allocated to them at every frame by the BS.

For convenience, it will be assumed herein that the BS allocates a sub-CQICH field 610-1 with a CQICH index=CQI #1 to a first MS among the N MSs, allocates a sub-CQICH field 610-2 with a CQICH index=CQI #2 to a third MS, allocates a sub-CQICH field 610-3 with a CQICH index=CQI #3 to a second MS, allocates a sub-CQICH field 610-(N−1) with a CQICH index=CQI #(N−1) to an $N^{th}$ MS, and allocates a sub-CQICH field 610-N with a CQICH index=CQI #N to an $(N-1)^{th}$ MS. Then the MSs, because they already know indexes of CQICHs allocated to them from the MAP message as described above, transmit their CQIs to the BS over sub-CQICH fields corresponding to the recognized CQICH indexes.

Upon receipt of CQIs from the MSs over CQICHs, the BS generates power control information of the MSs and generates a power control bit sequence according to the generated power control information as described above, and then maps the generated power control information for the MSs to the corresponding MSs according to the CQICH allocation information of the MSs. That is, when all CQICH channels are allocated to all of N MSs, as shown in FIG. 6A, the BS maps the power control information for the MSs to the corresponding MSs in a message, for example, a MAP message field, i.e. DL-MAP message field or UL-MAP message field, of a frame, according to the CQICH allocation information of the MSs, as shown in FIG. 6B.

That is, as the BS generates power control information according to the CQIs after allocating CQICHs to all of N MS and receiving the CQIs over the allocated CQICHs as described above, one power control information field allocated for transmitting power control information for the MSs is divided into N sub-fields 660-1, 660-2, 660-3, . . . , 660-(N−1) and 660-N, where N is the number of MSs, as described in FIG. 3, and then mapped to the N MSs, i.e. allocated to the N MSs on a one-to-one basis. The N sub-fields 660-1, 660-2, 660-3, . . . , 660-(N−1) and 660-N are mapped according to the CQICH allocation information of the MSs, for example, indexes of CQICHs allocated to the MSs.

Under the foregoing assumption given for convenience, a first sub-field 660-1 among the N sub-fields 660-1, 660-2, 660-3, . . . , 660-(N−1) and 660-N is mapped, or allocated, to the first MS to which the sub-CQICH field 610-1 with a CQICH index=CQI #1 is allocated; a second sub-field 660-2 is mapped, or allocated, to the third MS to which the sub-CQICH field 610-2 with a CQICH index=CQI #2 is allocated; a third sub-field 660-3 is mapped, or allocated, to the second MS to which the sub-CQICH field 610-3 with a CQICH index=CQI #3 is allocated; an $(N-1)^{th}$ sub-field 660-(N−1) is mapped, or allocated, to the $N^{th}$ MS to which the sub-CQICH field 610-(N−1) with a CQICH index=CQI #(N−1) is allocated; and an N'h sub-field 660-N is mapped, or allocated, to the $(N-1)^{th}$ MS to which the sub-CQICH field 610-N with a CQICH index=CQI #N is allocated. The power control information is transmitted to the MSs, i.e. broadcasted to N MSs located in the cell, over the sub-fields 660-1, 660-2, 660-3, . . . , 660-(N−1) and 660-N, which are allocated to the MSs according to the CQICH allocation information of the MSs. Then, the MSs each recognize, from the CQICH allocation information included in the MAP message field, a sub-field over which power control information associated with each MS is transmitted, the sub-field being allocated in the one power control information field, detect power control information transmitted over the sub-field, and control power for the associated MS depending on the detected power control information.

Figure 7B:
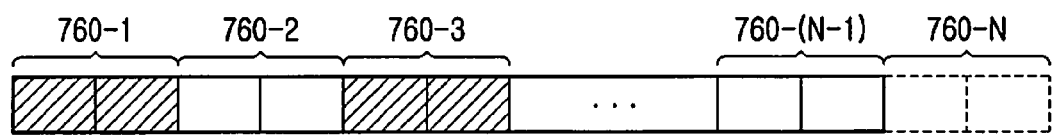

FIGS. 7A and 7B show a method of mapping power control information to corresponding MSs according to CQICH allocation information of MSs in a communication system according to the present invention. A description of FIGS. 7A and 7B is given herein for a case where no CQICH is allocated to the third MS and the $(N-1)^{th}$ MS in FIGS. 6A and 6B, and thus, the third MS and the $(N-1)^{th}$ MS do not transmit their CQIs to the BS.

Referring to FIGS. 7A and 7B, in a communication system, when there are N MSs located in a cell, a CQICH field in an uplink burst field of a frame is divided into N sub-CQICH fields 710-1, 710-2, 710-3, . . . , 710-(N−1) and 710-N, and then allocated to the N MSs on a one-to-one basis. The allocation information of the divided CQICH field is broadcast to the N MSs over a MAP message field, i.e. UL-MAP message field, of the frame, as described above. In addition, the sub-CQICH fields 710-1, 710-2, 710-3, . . . , 710-(N−1) and 710-N are allocated to the MSs at every frame so that the MSs may transmit CQIs to the BS. As described above, based on the MAP message, the MSs each recognize CQICHs allocated to them by the BS, in other words, recognize indexes CQI #1, CQI #2, CQI #3, . . . , #CQI #(N−1) and CQI #N of CQICHs, for example, unique numbers and allocation orders of CQICHs allocated to them at every frame by the BS.

Under the foregoing assumption that the BS allocates no CQICH to the third MS and the $(N-1)^{th}$ MS among the N MSs, because the BS allocates a sub-CQICH field 710-1 with a CQICH index=CQI #1 to a first MS among the N MSs and allocates no CQICH to the third MS, a sub-CQICH field 710-2 with a CQICH index=CQI #2 is not allocated, and because the BS allocates a sub-CQICH field 710-3 with a CQICH index=CQI #3 to a second MS, allocates a sub-CQICH field 710-(N−1) with a CQICH index=CQI #(N−1) to an $N^{th}$ MS, and allocates no CQICH to an $(N-1)^{th}$ MS, a sub-CQICH field 710-N with a CQICH index=CQI #N is not allocated. Then, the MSs, because they already know indexes of CQICHs allocated to them from the MAP message as described above, transmit their CQIs to the BS over sub-CQICH fields corresponding to the recognized CQICH indexes. That is, while the BS in FIG. 6A allocates CQICHs so all of N MSs may transmit their CQIs to the BS, i.e. allocates the N sub-fields 660-1, 660-2, 660-3, . . . , 660-(N−1) and 660-N to all of N MSs, respectively, the BS in FIG. 7A allocates no CQICH to the third MS and the $(N-1)^{th}$ MS among the N MSs so they do not transmit their CQIs to the BS, and thus, the sub-CQICH fields 710-2 and 710-N with CQICH index=CQI #2 and CQI #N are not allocated to the MSs.

Upon receipt of CQIs over CQICHs from the MSs except for the third MS and the $(N-1)^{th}$ MS among the N MSs, the BS generates power control information of the MSs and generates a power control bit sequence according to the generated power control information as described above, and then maps the generated power control information of the MSs to the corresponding MSs according to the CQICH allocation information of the MSs. That is, when CQICH channels are allocated to the remaining MSs except for the third MS and the $(N-1)^{th}$ MS among the N MSs, as shown in FIG. 7A, the BS maps the power control information for the MSs to the corresponding MSs in a message, for example, a MAP message field, i.e. DL-MAP message field or UL-MAP message field, of a frame, according to the CQICH allocation information of the MSs, as shown in FIG. 7B.

That is, as the BS generates power control information according to the CQIs after allocating CQICHs to the remaining MSs except for the third MS and the (N−1)$^{th}$ MS among the N MS and receiving the CQIs over the allocated CQICHs as described above, one power control information field allocated for transmitting power control information for the MSs is divided into N sub-fields 760-1, 760-2, 760-3, . . . , 760-(N−1) and 760-N, where N is the number of MSs, as described in FIG. 3, and then mapped, i.e. allocated, to the remaining MSs except for the third MS and the (N−1)$^{th}$ MS among the N MSs, respectively. The N sub-fields 760-1, 760-2, 760-3, . . . , 760-(N−1) and 760-N are mapped according to the CQICH allocation information of the MSs, for example, indexes of CQICHs allocated to the MSs.

Under the foregoing assumption given for convenience, a first sub-field 760-1 among the N sub-fields 760-1, 760-2, 760-3, . . . , 760-(N−1) and 760-N is mapped, or allocated, to the first MS to which the sub-CQICH field 710-1 with a CQICH index=CQI #1 is allocated; a second sub-field 760-2 is not mapped, or not allocated, to any MS as the sub-CQICH field 710-2 with a CQICH index=CQI #2 is not allocated; a third sub-field 760-3 is mapped, or allocated, to the second MS to which the sub-CQICH field 710-3 with a CQICH index=CQI #3 is allocated; an (N−1)$^{th}$ sub-field 760-(N−1) is mapped, or allocated, to the N$^{th}$ MS to which the sub-CQICH field 710-(N−1) with a CQICH index=CQI #(N−1) is allocated; and an N$^{th}$ sub-field 760-N is not mapped, or not allocated, to any MS as the sub-CQICH field 710-N with a CQICH index=CQI #N is not allocated. The power control information is transmitted to the MSs, i.e. broadcasted to N MSs located in the cell, over the sub-fields 760-1, 760-3, . . . , 760-(N−1), which are allocated to the MSs according to the CQICH allocation information of the MSs. Then, the MSs each recognize, from the CQICH allocation information included in the MAP message field, a sub-field over which its power control information is transmitted, the sub-field being allocated in the one power control information field, detect power control information transmitted over the sub-field, and control power associated with each MS depending on the detected power control information. Of the second sub-field 760-2 and the N$^{th}$ sub-field 760-N not allocated to the MSs, the N$^{th}$ sub-field 760-N can be allocated for transmission of data other than transmission of power control information, thereby contributing to a reduction in length of a power control burst and to efficient use of resources. A description will now be made of a scheme in which a BS transmits in a message the power control bit sequence of the power control information generated according to CQIs received from MSs in the communication system according to the present invention.

Table 4 shows a format of a MAP message when the BS generates a power control bit sequence of power control information generated according to CQIs received from MSs and transmits the power control bit sequence in the MAP message, for example, DL-MAP message or UL-MAP message, in the communication system according to the present invention.

TABLE 4

| Syntax | Bits |
|---|---|
| MAP Message{ | |
| ... | |
| Power_Control_Broadcasting{ | |
| Length | x-bits |
| Power_Control_Bit_Sequence | variable |
| } | |
| } | |

As shown in Table 4, the MAP message includes a Power_Control_Broadcasting field, and the Power_Control_Broadcasting field includes a 'Length' field indicating a length of the Power_Control_Broadcasting field, and a Power_Control_Bit_Sequence field indicating a power control bit sequence generated according to power control information of the MSs. The power control bit sequence has been described with reference to FIG. 4, and length information of the power control bit sequence is transmitted to the MSs over a Downlink Channel Descriptor (DCD) or an Uplink Channel Descriptor (UCD). The DCD and the UCD are messages periodically transmitted with defined physical channel characteristics of the downlink and the uplink, respectively, and these are not directly related to the present invention, so associated descriptions are omitted. The BS broadcasts in the MAP message to the MSs a power control bit sequence with power control information generated according to CQIs received over CQICHs from the MSs.

Table 5 shows MAP IEs when the BS transmits in DL-MAP IEs or UL-MAP IEs of a MAP message, for example, DL-MAP message or UL-MAP message, a power control bit sequence of power control information generated according to CQIs received from the MSs in the communication system according to the present invention.

TABLE 5

| Syntax | Bits |
|---|---|
| DL(or UL)-MAP_IE{ | |
| CID=FFFF(Broadcasting CID) | 16 bits |
| DIUC(or UIUC) | 4 bits |
| Extended-DIUC(or(UIUC)_dependent_IE{ | |
| Power_Control_Broadcast_IE{ | |
| Extended_DIUC(or UIUC) | 4 bits |
| Length | x-bits |
| Power_Control_Bit_Sequence | variable |
| } | |
| } | |
| } | |

As shown in Table 5, the DL-MAP IEs or UL-MAP IEs of the DL-MAP message or UL-MAP message include CID and UIUC or DIUC for per-burst allocation information and power control information of the MSs, and extended UIUC-dependent IEs or extended DIUC-dependent IEs. The extended UIUC-dependent IEs or extended DIUC-dependent IEs include the power control bit sequence. With reference to Table 6, a description will now be made of a method in which the BS transmits, in a power control message in a type of a MAC message other than the MAP message, the power control bit sequence of power control information generated according to CQIs received from the MSs in the communication system according to the present invention.

Table 6 shows a format of a power control message when a BS transmits in a power control message a power control bit sequence of power control information generated according to CQIs received from MSs in a communication system according to the present invention.

TABLE 6

| Syntax | Bits |
| --- | --- |
| Power_Control_Message{ | |
| Management Message Type | 8 bits |
| Length | x-bits |
| Power_Control_Bit_Sequence | variable |
| } | |

Figure 8:
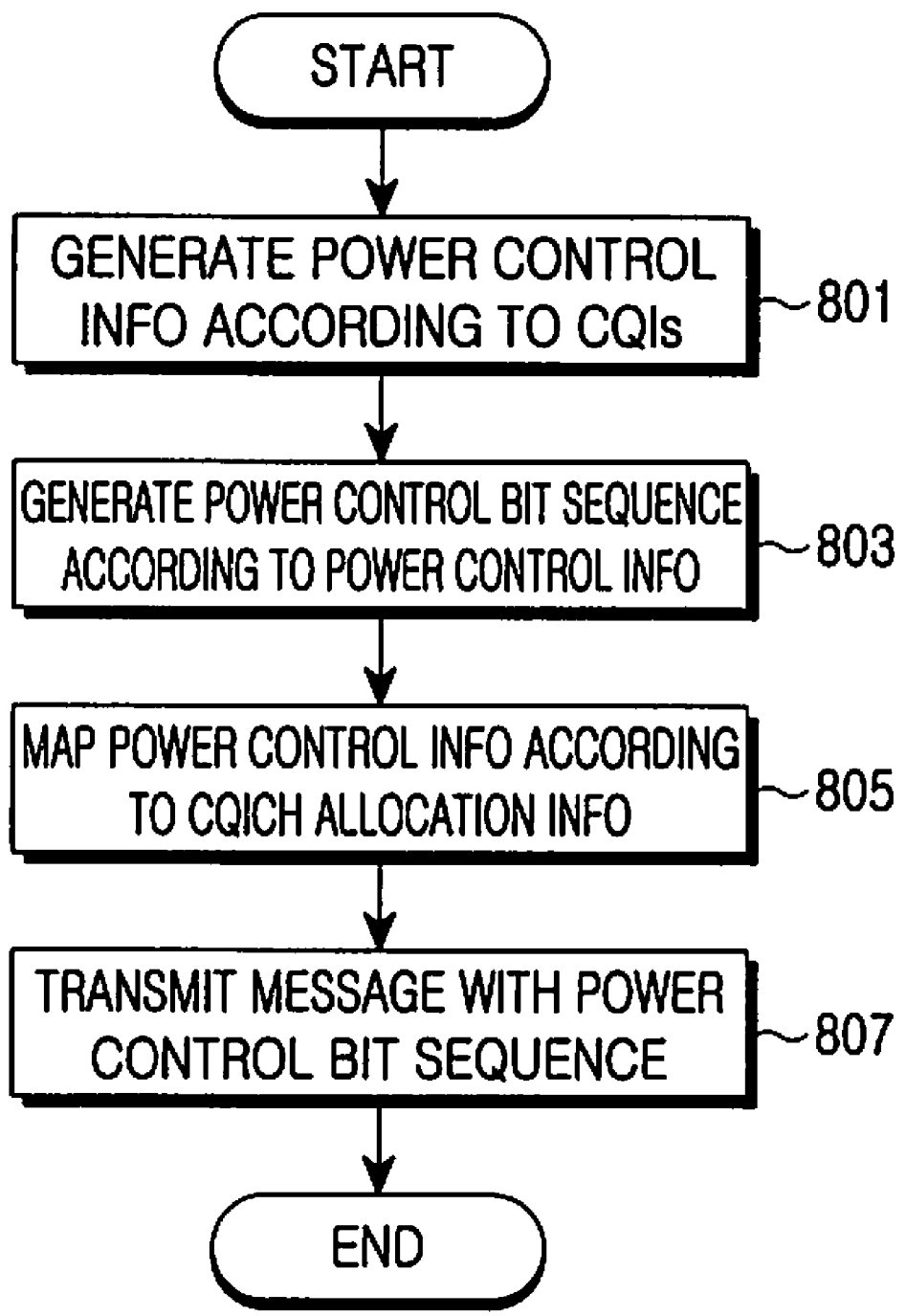
FIG. 8 is a diagram illustrating an operation in which a BS controls power of MSs in a communication system according to the present invention.

As shown in Table 6, the power control message includes a 'Management Message Type' field indicating a type of the corresponding management message, a 'Length' field indicting a length of the MAC message, and a Power_Control_Bit_Sequence field indicating a power control bit sequence generated according to power control information of the MSs. With reference to FIG. 8, a description will now be made of an operation in which a BS controls power of MSs in a communication system according to the present invention.

FIG. 8 shows an operation in which a BS controls power of MSs in a communication system according to the present invention. Referring to FIG. 8, in step 801, the BS receives CQIs of MSs over CQICHs previously allocated to receive CQIs from the MSs located in the cell of the BS, and generates power control information of the MSs according to the received CQIs. Thereafter, in step 803, the BS generates a power control bit sequence according to the generated power control information as described with reference to FIG. 4. An operation of generating the power control bit sequence has been described in FIG. 4.

Next, in step 805, the BS allocates CQICHs to the MSs so the MSs may transmit their CQI information as described above, and maps the power control information to the corresponding MSs according to the CQICH allocation information. That is, the BS divides one power control information field previously allocated for transmission of the power control information generated in step 801, according to the number of the MSs, and then allocates the divided power control information fields to the MSs according to the CQICH allocation information, thereby mapping the power control information to the corresponding MSs. An operation of mapping the power control information to the MSs according to the CQICH allocation information has been described with reference to FIGS. 6 and 7.

Figure 9:
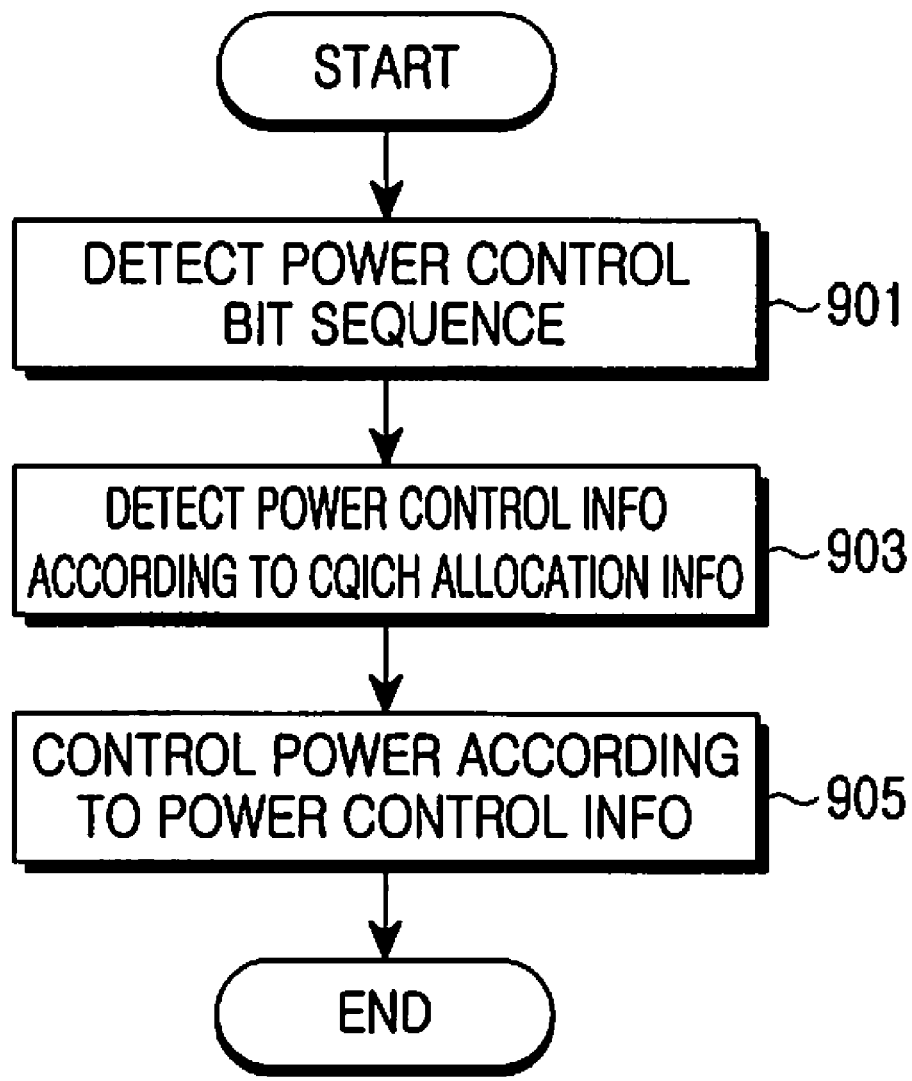
FIG. 9 is a diagram illustrating an operation of controlling power by an MS in a communication system according to the present invention.

In step 807, the BS includes the power control bit sequence generated in step 803 in a message, and then transmits, or broadcasts, the message including the power control bit sequence to the MSs located in the cell. The message including the power control bit sequence of the generated power control information is a power control message in a type of a MAC message, or a MAP message, and is broadcast to the MSs. With reference to FIG. 9, a description will now be made of an operation of controlling power by an MS in a communication system according to the present invention.

FIG. 9 shows an operation of controlling power by an MS in a communication system according to the present invention. Referring to FIG. 9, in step 901, the MS transmits a CQI of the MS to a BS of the MS over a CQICH allocated by the BS, and upon receipt of a message from the BS, detects a power control bit sequence included in the message. Based on information included in the message received from the BS, the MS recognizes a field where the power control bit sequence is transmitted. An operation of generating, by the BS, power control information of the MS according to the CQI and transmitting the message including the power control information has been previously described. In addition, an operation of recognizing, by the MS, the field where the power control bit sequence is transmitted, based on the information included in the message received from the BS, is equal to the operation of recognizing one power control information field based on the MAP message, so a description thereof will be omitted.

Thereafter, in step 903, the MS detects power control information corresponding thereto from the power control information transmitted over the power control information field according to the CQICH allocation information included in the message. That is, because the BS maps the power control information to the corresponding MSs according to the CQICH allocation information before transmission as described above, the MS detects power control information of the MS according to the mapping. An operation of detecting the power control information by the MS has been described above. Next, in step 905, the MS controls transmission power of the MS, i.e. power of a transmission signal to the BS, according to the power control information detected in step 903.

Figure 10A:
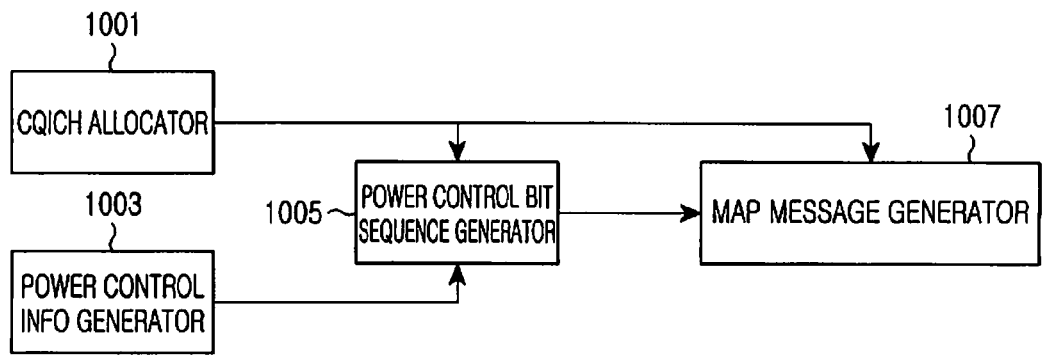
FIGS. 10A and 10B are schematic diagrams illustrating a power controller of a BS in a communication system according to the present invention.
Figure 10B:
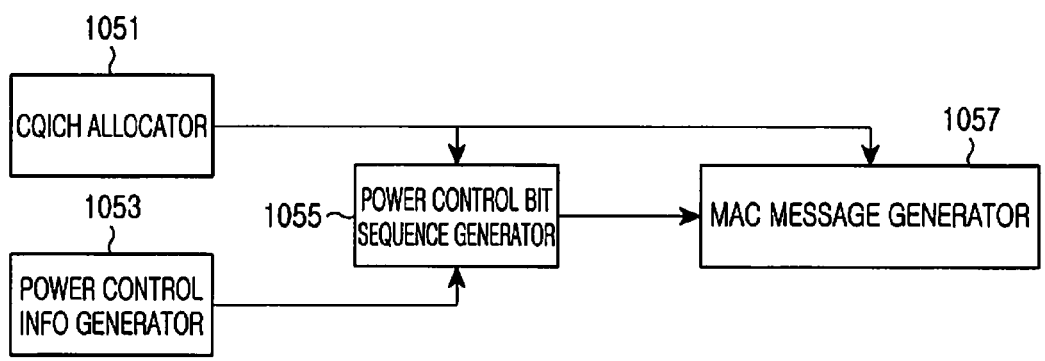

FIGS. 10A and 10B show a power controller of a BS in a communication system according to the present invention. The power controller shown in FIG. 10A is for a case where a BS transmits a power control bit sequence in a MAP message, and the power controller shown in FIG. 10B is for a case where a BS transmits a power control bit sequence in a MAC message, i.e. power control message.

Referring to FIG. 10A, the power controller of the BS includes a CQICH allocator 1001 for allocating CQICHs to receive CQIs from MSs located in the cell of the BS, a power control information generator 1003 for receiving CQIs of the MSs over the CQICHs allocated by the CQICH allocator 1001 and generating power control information of the MSs according to the received CQIs, a power control bit sequence generator 1005 for generating a power control bit sequence according to the power control information generated by the power control information generator 1003 as described with reference to FIG. 4, and a MAP message generator 1007 for generating a MAP message including the CQICH allocation information of MSs, allocated by the CQICH allocator 1001, and the power control bit sequence generated by the power control bit sequence generator 1005, and then broadcasting the generated MAP message to the MSs. The power control bit sequence generator 1005 maps the power control information of the MSs, received from the power control information generator 1003, to the corresponding MSs according to the CQICH allocation information of the MSs, allocated by the CQICH allocator 1001, and then transmits the generated power control bit sequence to the MAP message generator 1007. This power control operation of the BS has been described above.

Referring to FIG. 10B, the power controller of the BS of FIG. 10B is similar to the power controller of the BS of FIG. 10A, except that the power controller of FIG. 10A includes a MAP message generator 1007 for transmitting the power control bit sequence in a MAP message, whereas the power controller of FIG. 10B includes a MAC message generator 1057 for transmitting a power control bit sequence in a MAC message.

More specifically, the power controller of the BS of FIG. 10B includes a CQICH allocator 1051 for allocating CQICHs to receive CQIs from MSs located in the cell of the BS, a power control information generator 1053 for receiving CQIs of the MSs over the CQICHs allocated by the CQICH allocator 1051 and generating power control information of the MSs according to the received CQIs, a power control bit sequence generator 1055 for generating a power control bit sequence according to the power control information generated by the power control information generator 1053 as described with reference to FIG. 4, and a MAC message generator 1057 for generating a MAC message including the CQICH allocation information of the MSs, allocated by the CQICH allocator 1051, and the power control bit sequence generated by the power control bit sequence generator 1055, and then broadcasting the generated MAC message to the MSs. The power control bit sequence generator 1055 maps the power control information of the MSs, received from the power control information generator 1053, to the corresponding MSs according to the CQICH allocation information of the MSs, allocated by the CQICH allocator 1051, and then transmits the generated power control bit sequence to the MAC message generator 1057. This power control operation of the BS has been described above.

Figure 11:
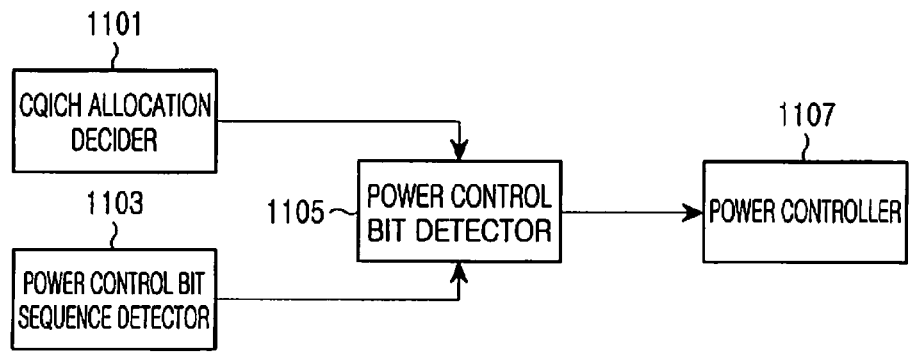
FIG. 11 is a diagram illustrating a power controller of an MS in a communication system according to the present invention.

FIG. 11 shows a power controller of an MS in a communication system according to the present invention. Referring to FIG. 11, the power controller of the MS includes a CQICH allocation decider 1101 for, upon receipt of a message from a BS, determining whether a CQICH of the MS is allocated depending on CQICH allocation information included in the message, and detecting CQICH allocation information from the message when it is determined that the CQICH of the MS is allocated, a power control bit sequence detector 1103 for detecting a power control bit sequence included in the message, a power control information detector 1105 for detecting power control information corresponding to the MS itself from the power control bit sequence detected by the power control bit sequence detector 1103 according to the CQICH allocation information detected by the CQICH allocation decider 1101, and a power controller 1107 for controlling transmission power to the BS according to the power control information detected by the power control information detector 1105. The power control bit sequence detector 1103 recognizes a field where the power control bit sequence is transmitted, depending on the information included in the message received from the BS, and because the BS maps the power control information to the corresponding MSs according to the CQICH allocation information before transmission, the power control information detector 1105 detects power control information according to the mapping. This power control operation of the MS has been described before.

As is apparent from the foregoing description, according to the present invention, a BS generates power control information according to channel information received from MSs located in a cell of the BS, and broadcasts, to the MSs, generated power control information of the MSs according to allocation information of channels allocated to receive the channel information. As a result, even though a number of MSs located in the cell increases, the BS can transmit per-frame power control information of the MSs over one burst field, thereby minimizing an increase in the overhead and facilitating fast power control of the MSs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling power at a base station (BS) in a communication system, the method comprising:
   generating a power control MAP message including power control information elements for power control of a plurality of mobile stations (MSs); and
   transmitting to the plurality of MSs the power control MAP message including the power control information elements,
   wherein the power control information elements are a sequence of power control commands of a total number of Channel Quality Information CHannels (CQICHs) in a CQICH region of a frame and an i-th power control command in the sequence of the power control commands is a power adjustment to an MS that transmitted the i-th CQICH on the CQICH region of the frame.

2. The method of claim 1, further comprising:
   transmitting allocation information indicating the CQICHs allocated to the plurality of MSs.

3. The method of claim 1, wherein each of the power control information elements comprises at least one bit for indicating power adjustment of each MS.

4. The method of claim 1, wherein each of the power control information elements indicates that each MS is ordered to increase or decrease a power level of each MS by a predetermined value.

5. The method of claim 1, wherein the power control MAP message is transmitted via a MAP message in the frame.

6. The method of claim 1, wherein the power control MAP message includes a bit sequence.

7. The method of claim 6, further comprising:
   transmitting to the plurality of MSs a number of bits of the power control information elements by using an Uplink Channel Descriptor (UCD) message.

8. The method of claim 1, wherein each of the power control information elements is transmitted without an identifier of each MS.

9. A method for controlling power at a mobile station (MS) in a communication system, the method comprising:
   receiving, from a base station (BS), a power control MAP message including power control information elements for power control of a plurality of MSs; and
   detecting a power control information element corresponding to a Channel Quality Information CHannel (CQICH) allocated to the MS from the power control information elements,
   wherein the power control information elements are a sequence of power control commands of a total number of CQICHs in a CQICH region of a frame and an i-th power control command in the sequence of the power control commands is a power adjustment to an MS among the plurality of MSs that transmitted the i-th CQICH on the CQICH region of the frame.

10. The method of claim 9, further comprising:
    receiving allocation information indicating the CQICHs allocated to the plurality of MSs, before receiving the power control information elements.

11. The method of claim 9, wherein each of the power control information elements comprises at least one bit for indicating power adjustment of each MS.

12. The method of claim 9, wherein each of the power control information elements indicates that each MS is ordered to increase or decrease a power level of each MS by a predetermined value.

13. The method of claim 9, wherein the power control MAP message is received via a MAP message in the frame.

14. The method of claim 9, wherein the power control MAP message includes a bit sequence.

15. The method of claim 14, further comprising:
    receiving from the BS a number of bits of the power control information elements by using an Uplink Channel Descriptor (UCD) message.

16. The method of claim 9, wherein each of the power control information elements is received without an identifier of each MS.

17. A base station (BS) for controlling power in a communication system, the BS comprising:
- a generator for generating a power control MAP message including power control information elements for power control of a plurality of mobile stations (MSs); and
- a transmitter for transmitting the power control MAP message including the arranged power control information elements,
- wherein the power control information elements are a sequence of power control commands of a total number of Channel Quality Information CHannels (CQICHs) in a CQICH region of a frame and an i-th power control command in the sequence of the power control commands is a power adjustment to an MS among the plurality of MSs that transmitted the i-th CQICH on the CQICH region of the frame.

18. The BS of claim 17, further comprising:
- a channel allocator for generating allocation information indicating the CQICHs allocated to the plurality of MSs before generating the arranged power control information elements and transmitting the allocation information to the plurality of MSs.

19. The BS of claim 17, wherein each of the power control information elements comprises at least one bit for indicating power adjustment of each MS.

20. The BS of claim 17, wherein each of the power control information elements indicates that each MS is ordered to increase or decrease a power level of each MS by a predetermined value.

21. The BS of claim 17, wherein the power control MAP message is transmitted via a MAP message in the frame.

22. The BS of claim 17, wherein the power control MAP message includes a bit sequence.

23. The BS of claim 22, further comprising:
- a message transmitter for generating an Uplink Channel Descriptor (UCD) message including a number of bits of the power control information elements and transmitting the UCD message to the plurality of MSs.

24. The BS of claim 17, wherein each of the power control information elements is transmitted without an identifier of each MS.

25. A mobile station (MS) for controlling power in a communication system, the MS comprising:
- a receiver for receiving, from a base station (BS), a power control MAP message including power control information elements for power control of a plurality of MSs; and
- a detector for detecting a power control information element corresponding to a Channel Quality Information CHannel (CQICH) allocated to the MS from the power control information elements,
- wherein the power control information elements are a sequence of power control commands of a total number of CQICHs in a CQICH region of a frame and an i-th power control command in the sequence of the power control commands is a power adjustment to an MS among the plurality of MSs that transmitted the i-th CQICH on the CQICH region of the frame.

26. The MS of claim 25, wherein receiver receives allocation information indicating the CQICHs allocated to the plurality of MSs, before receiving the message.

27. The MS of claim 25, wherein each of the power control information elements comprise at least one bit for indicating power adjustment of each MS.

28. The MS of claim 25, wherein each of the power control information elements indicates that each MS is ordered to increase or decrease a power level of each MS by a predetermined value.

29. The MSs of claim 25, wherein the power control MAP message is received via a MAP message in the frame.

30. The MS of claim 25, wherein the power control MAP message includes a bit sequence.

31. The MS of claim 30, wherein the receiver receives, from the BS, a number of bits of the power control information elements by using an Uplink Channel Descriptor (UCD) message.

32. The MS of claim 25, wherein each of the power control information elements is received without an identifier of each MS.

* * * * *